June 5, 1945.   J. W. DAWSON   2,377,328
RESISTANCE WELDING SYSTEM
Filed Feb. 2, 1943   2 Sheets-Sheet 1

INVENTOR
JOHN W. DAWSON,
BY [signature]
ATTY.

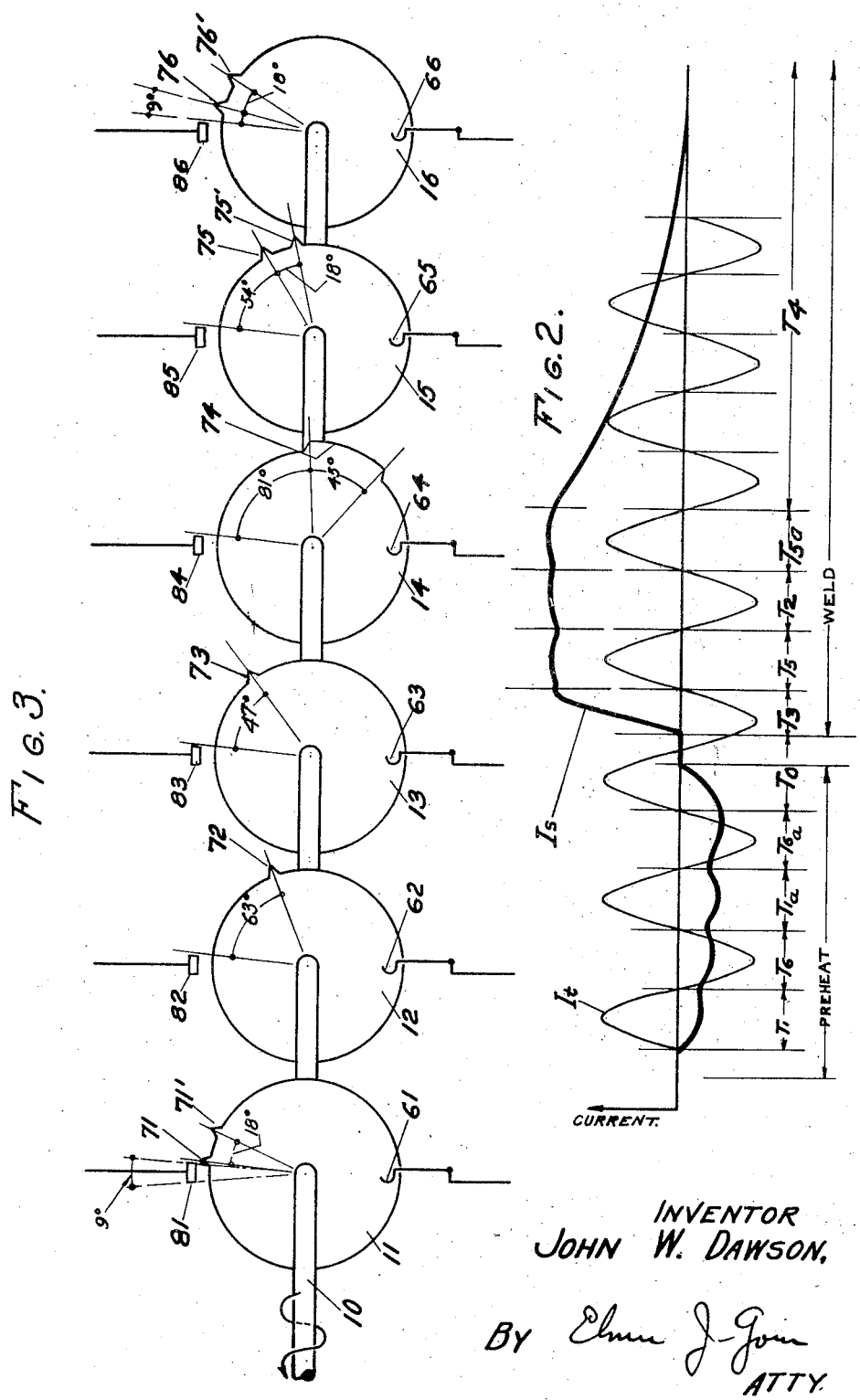

Patented June 5, 1945

2,377,328

UNITED STATES PATENT OFFICE 2,377,328

RESISTANCE WELDING SYSTEM

John W. Dawson, West Newton, Mass., assignor to Raytheon Manufacturing Company, Newton, Mass., a corporation of Delaware Application February 2, 1943, Serial No. 474,470

16 Claims. (Cl. 219—4)

This invention relates to a resistance welding system of the type in which electric energy is stored in a condenser and subsequently discharged through a welding transformer.

In systems of the type to which the invention relates it has been found desirable, as described in the copending application of Hans Klemperer, Serial No. 316,798, filed February 1, 1940, to apply the welding energy in the form of a single impulse in which the current rises abruptly to a predetermined level and is thereafter maintained relatively constant for a substantial portion of the welding impulse, after which the current is permitted to decay substantially exponentially. In that case a plurality of condensers discharging in overlapping sequence into the welding load are used to provide the single welding impulse.

It is among the objects of the present invention to provide for a similar welding impulse without the necessity of using a plurality of condenser banks of relatively large capacity.

In my copending application, Serial No. 320,079, filed February 21, 1940, there is disclosed a welding system in which the initial rise of welding current is derived from an energy storage means, such as a condenser, and the remainder of the current impulse is obtained from a separate source of current, such as an alternating current supply line. Such a system provides the desired initial rapid rise in the welding current to a predetermined level and thereafter maintains such level for a limited period. However, in that case the duration of the welding impulse, that is the period during which the current may be maintained at the high predetermined level, is limited to not more than the duration of a half-wave of the alternating current supply line.

It is among the objects of the present invention to improve the systems, described in the above-mentioned copending applications, by providing an arrangement in which the welding current may be maintained relatively constant at the high level attained by the initial impulse for a much longer period of time than has heretofore been possible, and provide a welding impulse having considerable energy in which the current neither rises above nor falls below predetermined limits, during a substantial portion of the welding impulse. Accordingly the invention contemplates a system in which the energy stored in a condenser is used to supply the energy represented by the flux in the welding circuit, while a substantially direct current supplied to the primary winding of the transformer, immediately after the initial impulse from the condenser, maintains the current to the welding load substantially constant, at a level near the peak value, for a desired predetermined period of the order of one or more cycles of the alternating supply source.

In the resistance welding of some materials it has been found desirable to supply a certain amount of energy to the material to be welded for the purpose of preheating the same prior to the actual welding impulse.

A further object of the invention is to supply a pre-heating current at a low energy level immediately prior to the welding impulse, but in a direction opposite to the direction of the current during the welding impulse, for the purpose of reversing the flux in the welding transformer and permitting an abrupt increase of the current in a direction opposite to that of the pre-heating current upon the initiation of the welding impulse by the supply of energy from the condenser. Accordingly the invention contemplates a system in which the desired preheat is obtained in the same operation as that by which flux reversal is obtained.

The above and other objects and features of the invention will in part be obvious to those skilled in the art and in part to be set forth in more detail in the following description taken in conjunction with the accompanying drawings in which:

Fig. 2 is a set of curves illustrating the mode of operation of the invention; and Fig. 3 is a diagram of the timing device showing the relative timing of the ignition circuits of the various tubes.

Figure 1:
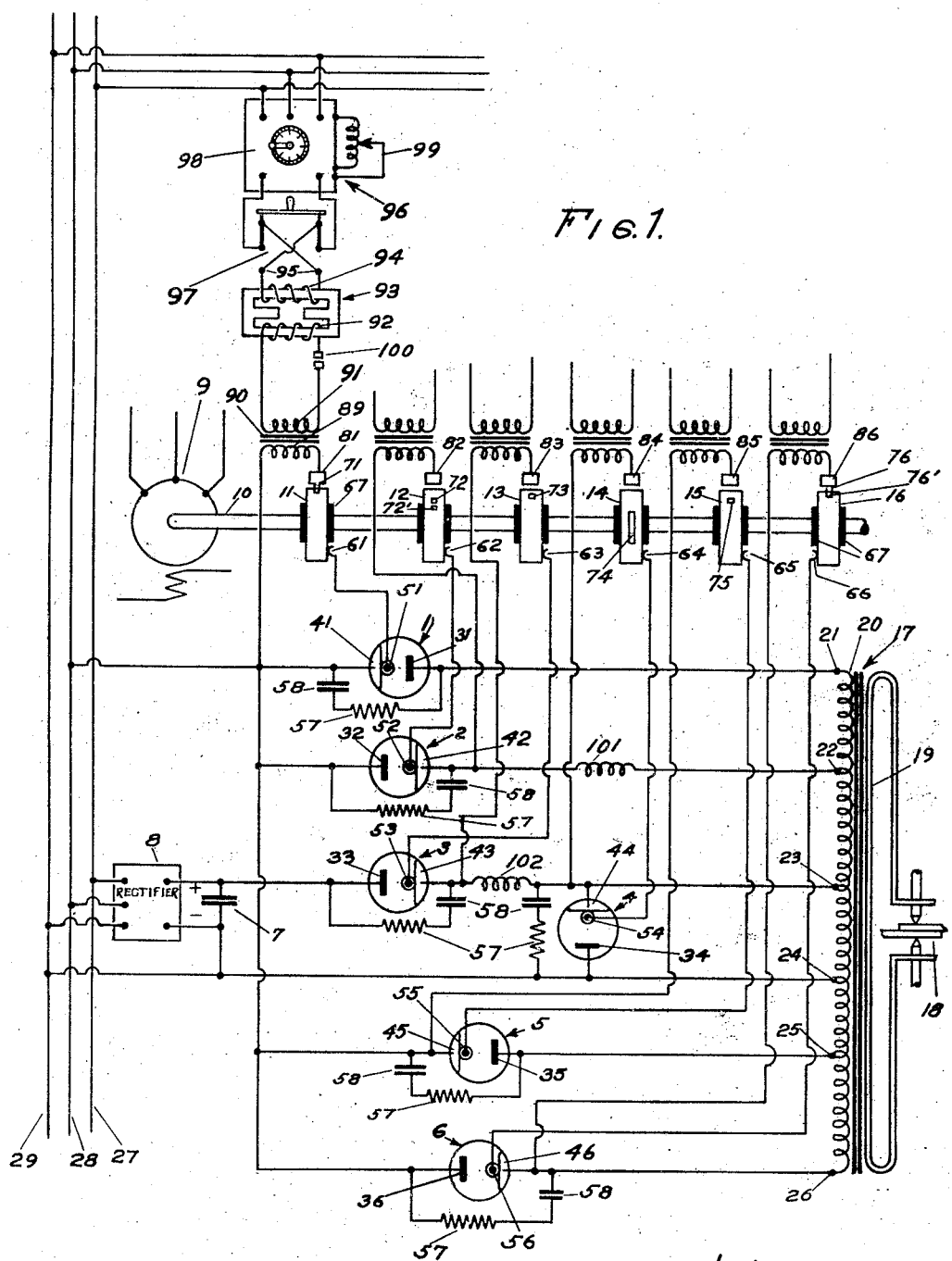
Fig. 1 is a diagram of a condenser welding system embodying my invention.

As shown in Fig. 1 in the drawings, the welding system includes: a discharge unit comprising six heavy current, mercury pool, ignition controlled tubes indicated by reference numerals 1 to 6, inclusive; a capacitor bank 7; a rectifier 8 for charging the capacitor bank; a timing assembly including a synchronous motor 9 which drives a shaft 10 carrying six rotary distributors 11 to 16, inclusive; and a welding transformer 17. All of these parts and their functions will be hereinafter more fully described.

Welding current is supplied to a welding load 18 from a secondary loop 19 of the transformer 17. The primary 20 of the transformer 17 is provided with a plurality of taps including upper end tap 21, intermediate taps 22 to 25 inclusive, and lower end tap 26. The primary 20 is adapted to be supplied with energy from an alternating current source, such as lines 27, 28 and 29 of a three-phase power supply source. This energy supply is received in part from condenser 7 which stores energy received from rectifier 8, and in part from the power supply line directly. In each instance the timing of the supply from the power source to one of the taps 21—26 of the primary winding 20 of the transformer 17 is controlled by one of the discharge tubes 1—6.

The tubes 1—6 may be any arc type tubes having controlled discharge, but are preferably of the type previously mentioned having anodes 31—36 and pool cathodes 41—46, usually of mercury. Igniters 51—56 are provided, one for each tube, for initiating a cathode spot on the pool in order to permit the tube to conduct current. Thus the igniters 51—56 constitute means for controlling the initiation of the discharge of their respective tubes, assuming a suitable potential difference exists between the anode and the cathode of the tube to be ignited at the time the igniting impulse is supplied. The igniters 51—56 may be any suitable type, but preferably are of the electrostatic type each consisting of a conductor separated and insulated from the cathode by a thin layer of glass. One tube suitable for the purposes of the present invention is disclosed in the United States patent to Percy L. Spencer, 2,257,768, and, in view of this example, other tubes having suitable characteristics may be selected by those skilled in the art. In order to assist the tubes in reliable starting, it is preferable that a resistance 57 in series with a condenser 58 be connected between the anode and the cathode of each tube.

The igniters 51—56 of the tubes 1—6 are adapted to be supplied with igniting impulses from an ignition timing assembly in the following manner: The igniters 51—56 are connected by brushes or other sliding contacts 61—66 respectively to the rotary distributors 11—16. Thus the igniter 51 of tube 1 is connected by way of one of the sliding contacts 61 to the distributor 11. The distributor 11 is suitably insulated from the shaft 10 by an insulating collar 67 and is provided with suitable contacts 71 and 71' on the peripheral surface thereof adapted to coact with a stationary contact 81 adjacent the distributor 11 to permit timed energy impulses to be supplied to the igniter 51 from the secondary winding 89 of an igniting transformer 90. It will be understood that the contacts 71 and 81 may be sliding contacts, or may be spark gap points which permit the current to jump the gap therebetween as the same come into juxtaposition during the rotation of the shaft 10. The igniting transformer 90 is provided with a primary winding 91 adapted to be supplied with voltage pulses from the secondary winding 92 of a peaking transformer 93. The primary winding 94 of the peaking transformer 93 is adapted to be energized from the terminals 95 of a phase-shifting device 96, which device includes a 180° phase-selector 97, a 60° phase-selector 98, and a phase-vernier 99. The phase-shifting device 96 is connected to a suitable source of alternating current which in the case shown is the three phase power supply lines 27, 28 and 29. By the phase-shifting device 96, the phase of the voltage supplied to the primary winding 94 may be adjusted at will throughout the range of 360°. Accordingly the time of the occurrence of voltage peaks across the secondary winding 92 may be selected as desired. Contact points 100 may be provided in the connections between the secondary winding 92 of the peaking transformer 93 and the primary winding 91 of the ignition transformer 90 to permit control of the ignition circuit by a suitable relay or switch. It will be understood that each of the igniters 52—56 of the other tubes 2, 3, 4, 5 and 6 are connected by similar sliding contacts 62—66 respectively to the corresponding distributors 12, 13, 14, 15 and 16, and that these distributors control ignition supply circuits, not fully shown but which are similar to that described and shown for supplying the igniter 51 of tube 1 with ignition impulses.

In operation ignition voltage is supplied from the lines 27, 28 and 29 through the phase-shifting device 96 to the primary 94 of the peaking transformer 93. The peaking transformer delivers peaks of fifty volts whenever the contacts 100 are closed. This peaked voltage is stepped up by the ignition transformer 90 and will spark over between the contact 71 on the distributor 11 and the stationary contact 81 when these contacts are in juxtaposition. The width of one or the other of the contacts 71 and 81 is such that they are in conductive relation to each other during each rotation of the distributor 11 for a period corresponding to one-half cycle of the 60 cycle supply source. The synchronous motor 9 drives the distributors 11—16 at a speed of 180 R. P. M. and accordingly each rotation of the distributor shaft 10 corresponds to a 20 cycle program. The distributor 11 serves the tube 1, and distributors 12, 13, 14, 15 and 16 serve the tubes 2, 3, 4, 5 and 6, respectively. When the contacts or segments 71 and 81 of distributor 11 are adjacent, a cathode spot will be excited upon the cathode 41 of tube 1 by the igniter 51 thereof, and accordingly the tube 1 will become conductive provided a suitable potential difference exists between the anode 31 and cathode 41 of this tube. The timing of the distributor 11 is made such that the contact 71 thereof is contiguous to the coacting contact 81, at the instant when the half-wave or pulse of current moving through line 29 of the power supply becomes positive relative to line 28. The tube 1 therefore becomes conductive at the same instant that a positive potential is applied to the anode 31 and current will flow from the line 29 to the tap 24 of the primary 20 and thence upwardly through the primary windings to the tap 21, and thence by way of tube 1 to the line 28.

The operation will be more clearly understood by referring to the set of curves shown in Fig. 2 and to the timing diagram shown in Fig. 3. The curves do not purport to show the operation of the system quantitatively although they do represent, in a general manner, the nature of the operation. The curve $I_s$ represents the current in the welding transformer, and the curve $I_t$ represents a 60 cycle alternating current wave inserted to show the relative timing. Referring to these figures, when the contact or point 71 moves adjacent to contact 81 a cathode spot in the tube 1 is excited by the igniter 51 and permits the supply of a half-wave of current to the transformer 17 indicated by the portion from $T_1$ of the curve $I_s$. This current which passes upwardly through the portion of the primary 20 between the taps 24 and 21 induces a low voltage heating current in the secondary 19 of the welding transformer which heating current is applied to the load 18.

The preheating for one-half cycle by passing primary current through the tube 1 is immediately followed by a similar half cycle of primary current passing through the tube 6. The ignition of this tube is controlled by distributor 16. The contacts of distributor 16 which control the ignition of tube 6 are so positioned that the contact 76 of this distributor moves adjacent to its coacting stationary contact 86 one-half wave later than the juxtaposition of the corresponding contacts 71 and 81 of the distributor 11. Thus, the cathode of the tube 6 is excited and this tube becomes conductive at an instant when the polarity of the current in lines 28 and 29 has reversed, that is to say, when the line 28 has become positive relative to line 29. Accordingly a positive potential is applied to the anode 36 of the tube 6. The tube becomes conductive and a half-wave or pulse of current flows from the line 28 through tube 6 and the tap 26 of the primary winding 20 to the tap 24 and thence to the power line 29. Thus current is supplied through a portion of the primary winding 20 in the same direction, during this second half-wave period, as the direction in which the first half-wave passed through the primary. Accordingly preheating current at low voltage continues to be induced in the secondary winding 19 of the welding transformer and applied to the load 18 as indicated by the portion $T_6$ of the curve.

If at the termination of the second half-wave period, that is the period during which the tube 6 was conductive, a second contact 71' of the distributor 11 comes adjacent the contact 81, then the cathode 41 of the tube 1 will again be excited at a time when a positive potential is applied to the anode 31 thereof and current will again flow, during the period $T_{1a}$ of the curve. The path of this current is from the line 29 to the tap 24 and upwardly through the primary winding 20 to the tap 21, through the tube 1 and thence to the line 28, the same as during the first half-wave period. Thus the preheating current may be supplied at a low value for as many half cycles as is desired. In the curves shown in Fig. 2 the tubes 1 and 6 are alternately excited and are conductive during two half-wave periods each of the preheating period. The annotations $T_1$, $T_6$, $T_3$ etc. indicate the periods during which the respective tubes 1, 6, 3, etc., are conductive.

Toward the end of the preheating of the load by means of current passing upwardly to portions of the primary coil 20, the preheat current is premitted to die out during a portion of the period $T_0$, during which period no tube is ignited. After the preheat current has died out a short period intervenes between the termination of the preheat current and the initiation of the welding current. This short period, corresponding to about 4 milliseconds, during which no current is supplied to the welding load and during which none of the tubes are conductive, provides a short period in which the previously fired tube may deionize. If a short deionization period were not permitted the tube might back-fire upon the discharge of the condenser 7.

At the end of the period $T_0$ the main welding current is initiated by the discharge of the condenser 7. The condenser 7 is continuously charged by the rectifier 8 and is discharged through the transformer 17 within a few milliseconds after the last half cycle of preheat has been supplied thereto. This discharge of the condenser 7 is controlled by the tube 3, the cathode 43 of which is excited by its igniter 53. The igniter 53 of the tube 3 is supplied with igniting impulses from an ignition circuit identical, except as regards timing, with that described in connection with tube 1. The timing of these impulses is controlled by the distributor 13 having a contact 73 which lags contact 76' by about 11° corresponding to a little more than one half wave of the source. This corresponds to a lag of 47° behind the contact 71 which initiated the program. The anode 33 of the tube 3 is connected to the positive pole of the condenser 7 and as the tube 3 becomes conductive the condenser 7 discharges through the tube 3 and current passes by way of tap 23 through a portion of the primary windings 20 to the tap 24 and thence to the opposite side of the condenser 7. It will be noted that the passage of current from the condenser 7 through a portion of the primary 20 is in the opposite direction to that in which the preheating current passed through a portion of the same primary. Thus any residual flux in the transformer 20 resulting from previous welding impulses is neutralized by the preheating current. As may be seen in Fig. 2, during the period $T_3$ the welding current rises abruptly, and, because of the intensity of the condenser current, attains a much higher value than and in the opposite direction to the value of the preheating current. Preferably this decay of the preheat current and increase of the welding current to its maximum intensity occurs in the course of about one cycle of the alternating power source so that upon the completion of the discharge of the condenser 7 the line 29 will again be positive relative to the line 28, and at this point the cathode 45 of the tube 5 is excited by its igniter 55 by ignition current timed by the distributor 15. The ignition current for tube 5 is supplied from an ignition circuit substantially identical with that described in connection with tube 1. The contact 75 of distributor 15 lags the contact 71 by 54° and is therefore timed to coincide with its coacting contact 85 three cycles later than the initiation of the program by contact 71. The line 29 is again positive relative to line 28, and the anode 35 of the tube 5 is positive relative to the cathode 45. As the cathode 45 is excited by the igniter 55 current flows from the line 29 through the tap 24 and thence downwardly through a portion of the primary winding 20 to the tap 25 and thence by way of tube 5 to the line 28. It will be observed that the direction of this half-wave of current through the primary is in the same direction as the direction of the immediately preceding current from the condenser 7. This current therefore tends to increase the value of the flux in the transformer 17 beyond the initial value attained by the condenser discharge. This increasing flux tends to maintain a substantially direct current through the load 18, during the period $T_5$ of the curve $I_s$.

By the end of the half-wave impulse, through the tube 5 the contact 72 upon the distributor 12 has moved to a point contiguous to its corresponding stationary contact 82, and igniting current is supplied to the igniter 52 of the tube 2. By this time the polarity of the lines 28 and 29 has again reversed so that the line 28 is now positive relative to the line 29 and accordingly the anode 32 of the tube 2 is positive relative to the cathode 42. Thereupon the tube 2 becomes conductive to permit the flow of current from line 28 to the tap 22 of the primary winding 20 and downwardly through a portion of this winding to the tap 24 and thence to the line 29. The direction of this half-wave of current through the primary 20 is in the same direction as that of the immediately preceding half-wave of current therethrough. Accordingly this current tends to increase the value of the flux in the transformer 17, and preferably in a manner to maintain the rate of increase of the flux substantially constant as shown by the portion T₂ of the curve I_s.

Because of this constant rate of change of flux a substantially constant direct current continues to be induced in the secondary loop. After the half-wave of current through the tube 2, the polarity of the lines 28 and 29 will again reverse and line 29 will now become positive relative to line 28. A second contact 75' on the distributor drum 15 is preferably provided in a position to become contiguous to the corresponding stationary electrode 85 and the igniter 55 will again excite a cathode spot on the cathode 45 of the tube 5 and this tube will again become conductive to permit the flow of current from the line 29 through the tap 24 and downwardly through the primary 20 to the tap 25 and thence to the line 28. The half-wave of current so supplied to the primary 20 continues to increase the flux of the transformer 17 preferably at about the same rate of increase as was effected by the discharge of the two preceding half-wave impulses of current through the primary 20. By maintaining the rate of increase of the flux substantially constant, a substantially constant direct current is induced in the secondary loop 19 of the welding circuit. This second discharge of tube 5 occurs during the period T_{5a} of the curve. Thus the passage of a substantially direct current through the primary 20 of the transformer 17 can induce in the secondary welding circuit loop a substantially constant direct current over a period corresponding to several alternations of current in the power supply lines. In other words, with the flux in the welding transformer steadily rising at a substantially constant rate, substantially constant direct current flows through the weld, and if desired additional half-wave impulses of current may be supplied from the power supply line, through portions of the welding transformer 20 in the same direction to continue to maintain a substantially constant rate of increase in the flux in the welding transformer and consequently a substantially direct current through the weld. This process may be continued as long as the flux of the system may be increased, that is to say, until the transformer has become saturated, after which a further supply of direct current through the primary can no longer induce current in the secondary. However, before the saturation point is reached substantially constant direct current may be made to flow through the weld for a considerable time, as measured in cycles of the power supply system, which time is limited first, by the value of the current maintained, second, by the load ohmic resistance, and third, by the cross-section of the welding transformer core.

After the welding current has been maintained for the desired period, at the high level initially attained by the discharge of the condenser 7 through a portion of the primary 20, the supply current from the alternating power source as controlled by tubes 2 and 5 is discontinued and the current through the welding load 18 is permitted to decay substantially exponentially.

In order to provide a shunt path across a portion of the primary winding 20, and prevent the return of energy from the welding transformer to the condenser bank, the igniter 54 of the tube 4 is supplied with igniting current timed by contact 74 on the drum of distributor 14 and coacting stationary contact 84, to excite a cathode spot upon the cathode 44 of the tube 4 and thus cause the tube 4 to become conductive. That portion of the original energy which is now inductively stored dies out exponentially as shown by that portion of the curve included in the portion T₄.

The inductances 101, and 102, between each of the tubes 2 and 3 and the primary 20 serve as electric cushions preventing certain current changes and thereby easing the duty of these tubes 2 and 3. Without these cushions, and assuming that the current commutates for instance from one tube to the other, the current flow in the first tube would immediately cease leaving the vapor in an ionized state. A high inverse voltage would be applied to the tube simultaneously. These conditions would cause considerable ion bombardment of the anode and might result in back-firing of the tube thus short-circuiting the condenser bank. The use of the inductances 101 and 102 improves this condition by reducing the rate of change of current and voltage of the tubes. Less ionization is thus left following conduction, and less steep rise in inverse voltage is developed. These protective inductances are designed to saturate at relatively low current and hence influence the current wave forms only at the base and transfer points.

From the above description, it will be observed that the present invention supplies a system for maintaining a substantially direct current at high predetermined value through the welding load of a resistance welding system. It will be obvious that the direct current so supplied is maintained for a substantial period of time as measured in half-wave impulses of an alternating power supply source. It will be further noted that the system maintains the welding current at substantially the initial value attained by the discharge of the condenser bank through the primary of the welding transformer without the necessity of using a plurality of condenser banks for the purpose of maintaining welding current value.

The system also provides for the supply of initial preheat energy to the welding load directly from the power source, but supplies this preheating current to the primary of the welding transformer or a portion thereof in a direction opposite to that in which the welding current is supplied to the transformer, and thus the preheating current serves to reverse the flux induced in the transformer by the previous welding current and increases the efficiency of the system to the extent that the residual flux is eliminated by the same means which supplied preheat to the welding load.

Although but one embodiment of the invention has been described herein other embodiments within the scope of the appended claims will be obvious to those skilled in the art from a consideration of the form shown.

What is claimed is:

1. The method of resistance welding which comprises supplying a controlled initial wave front of welding current to a welding load from energy storage means, and connecting a source of continuous current to said load at substantially the peak level of said wave front to maintain a substantially constant direct current through the load at said level during a large portion of the welding period.

2. The method of resistance welding which comprises supplying a controlled initial wave front of welding current to a welding load entirely from energy storage means, and thereupon connecting a source of alternating current to said load to maintain a substantially constant direct current through the load over a period greater than the half-wave period of said alternating current source.

3. A resistance welding system comprising energy storage means for supplying a controlled initial wave front of welding current to a welding load and means for connecting a source of current to said load at substantially the peak of said initial wave front to maintain a substantially constant direct current through the load during a substantial portion of the welding period.

4. A resistance welding system comprising means for supplying a controlled initial wave front of welding current to a welding load to establish a predetermined level of welding current and connecting a source of continuous current to said load to maintain a substantially constant direct current through the load at substantially said predetermined level for a substantial portion of the welding impulse.

5. A welding system of the storage type including a condenser, means for charging the condenser, a welding load circuit, means for discharging said condenser into said load circuit to initiate a welding impulse, means for passing continuous direct current through said load circuit to maintain a substantially constant current through the weld during a substantial portion of the welding period and at the level initiated by the discharge of said condenser.

6. A welding system comprising a condenser, means for charging said condenser, a welding load, an alternating current source, means to discharge said condenser into said load, and means effective at substantially the peak of the current from said condenser for maintaining a flow of direct current through said welding load from said alternating current source for a period greater than the half-wave period of said alternating current source.

7. A welding system comprising a condenser, means for charging said condenser, a welding load, an alternating current source, means to discharge said condenser into said load, and means effective upon the discharge of said condenser for maintaining a flow of direct current through said welding load from said alternating current source in the same direction as the condenser discharge for a period greater than the half-wave period of said alternating current source.

8. A welding system comprising a condenser, means for charging said condenser, a welding transformer having primary and secondary windings, means for discharging said condenser through windings of said primary to establish a controlled initial wave front of welding current through said secondary, a source of current, means for connecting said source of current to windings of said primary upon the establishment of said initial wave front for passing current continuously through said primary in the same direction as the condenser discharge during a substantial portion of the welding impulse, and thereby maintain direct current through said secondary.

9. A welding system comprising, a welding transformer having primary and secondary windings, means for supplying a controlled initial wave front of current through the primary winding to establish a controlled initial wave front of welding current through said secondary, a source of current, means for connecting said source of current to windings of said primary upon the establishment of said initial wave front for passing current continuously through said primary in the same direction as the initial wave front of current during a substantial portion of the welding impulse, and thereby maintain substantially constant direct current through said welding circuit.

10. A welding system comprising an electrical energy storage device, means for supplying storage energy to said storage device, a welding load, means for discharging the energy stored in said storage device into said load, a power supply line, and means effective upon the discharge of said storage device for supplying energy to said welding load from said power supply line at a level substantially equal to the highest level attained by the discharge of said condenser for a period longer than the duration of the phase of said power supply line.

11. A welding system comprising a condenser, means for charging said condenser, a welding load, means for discharging said condenser through said welding load, an alternating current source, means for supplying current to said welding load from said alternating current source in the same direction as the energy discharged from said condenser during the half-wave periods of said source immediately succeeding the discharge of said condenser.

12. A welding system comprising a condenser, means for charging said condenser, a welding load, means for discharging said condenser through said welding load, an alternating current source, means for supplying current to said welding load from said alternating current source in a direction opposite to the discharge of said condenser during the cycle of said source immediately preceding said discharge, and means for supplying current to said welding load from said alternating current source in the same direction as the energy discharged from said condenser during the half-wave period of said source immediately succeeding the discharge of said condenser.

13. A welding system comprising a welding load, an alternating current source, means for supplying current from said alternating current source to said welding load in a single direction over a plurality of alternations of said source for the purpose of supplying preheat to said load, a condenser, means for charging said condenser, and means effective within one cycle of the termination of the last half-wave of preheat energy to said load for discharging said condenser through said load in the opposite direction to the discharge of preheat energy therethrough, and means effective on the discharge of said condenser for supplying energy to said load in the same direction as the energy supplied thereto from said condenser.

14. A welding system comprising a welding load, an alternating current source, means for supplying current from said alternating current source to said welding load in a single direction over a plurality of alternations of said source for the purpose of supplying preheat to said load, a condenser, means for charging said condenser, and means effective after the termination of the last half-wave of preheat energy to said load for discharging said condenser through said load in the opposite direction to the discharge of preheat energy therethrough, and means effective on the discharge of said condenser for supplying energy from said alternating current source to said load in the same direction as the energy supplied thereto from said condenser.

15. A welding system comprising a welding load, an alternating current source, means for supplying current from said alternating current source to said welding load in a single direction over a plurality of alternations of said source for the purpose of supplying preheat to said load, a condenser, means for charging said condenser, and means effective after the termination of the last half-wave of preheat energy to said load for discharging said condenser through said load in the opposite direction to the discharge of preheat energy therethrough, and means effective on the discharge of said condenser for supplying energy from said alternating current source to said load in the same direction as the energy supplied thereto from said condenser for a period covering a plurality of successive half-wave periods of said alternating current source.

16. A welding system comprising a welding load, an alternating current source, means for supplying a plurality of successive half-wave impulses from said alternating current source to said welding load in a single direction for the purpose of supplying preheat current to said load, a condenser, means for charging said condenser, and means effective after the termination of the last half-wave of preheat energy to said load for discharging said condenser through said load in the opposite direction to the discharge of preheat current therethrough, and means effective on the discharge of said condenser for supplying energy to said load from said alternating current source in the same direction as the energy supplied thereto from said condenser, for a period covering a plurality of successive half-wave periods of said alternating current source.

JOHN W. DAWSON.